United States Patent
Lefrere et al.

(10) Patent No.: US 9,587,825 B2
(45) Date of Patent: Mar. 7, 2017

(54) SUBMERGED BURNER WITH MULTIPLE INJECTORS

(71) Applicant: SAINT-GOBAIN ISOVER, Courbevoie (FR)

(72) Inventors: Yannick Lefrere, Malakoff (FR); Julien Marie, Sceaux (FR); David Galley, Paris (FR); Sebastien Chesnel, Tremblay (FR); Frederic Lopepe, Rosny sous Bois (FR); Oleg Boulanov, Nogent sur Oise (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 14/377,397

(22) PCT Filed: Feb. 5, 2013

(86) PCT No.: PCT/FR2013/050237
§ 371 (c)(1),
(2) Date: Aug. 7, 2014

(87) PCT Pub. No.: WO2013/117851
PCT Pub. Date: Aug. 15, 2013

(65) Prior Publication Data
US 2015/0000343 A1    Jan. 1, 2015

(30) Foreign Application Priority Data

Feb. 8, 2012 (FR) ..................... 12 51170

(51) Int. Cl.
*C03B 5/44* (2006.01)
*F23D 14/08* (2006.01)
(Continued)

(52) U.S. Cl.
CPC ............ *F23D 14/08* (2013.01); *C03B 5/2356* (2013.01); *C03B 5/44* (2013.01); *F23C 3/004* (2013.01);
(Continued)

(58) Field of Classification Search
CPC ............... C03B 5/2356; C03B 2211/60; C03B 2211/22; F23D 14/08; F23D 14/78;
(Continued)

(56) References Cited

U.S. PATENT DOCUMENTS

| 4,671,765 A | 6/1987 | Tsai |
| 5,599,182 A | 2/1997 | Andrews et al. |

(Continued)

FOREIGN PATENT DOCUMENTS

| EP | 0 003 177 | 7/1979 |
| EP | 0 091 380 | 10/1983 |

(Continued)

OTHER PUBLICATIONS

International Search Report issued for International Application No. PCT/FR2013/050237, dated Apr. 26, 2013.

*Primary Examiner* — Queenie Dehghan
(74) *Attorney, Agent, or Firm* — Pillsbury Winthrop Shaw Pittman LLP

(57) ABSTRACT

A submerged burner for a glass- or rock-melting furnace, including a plurality of in-line injectors, each injector including a cylinder-shaped mixing chamber, with an ejection orifice, a fuel-supply duct and an oxidant-supply duct opening into the mixing chamber at the cylinder jacket in a direction causing a tangential flow of the fuel and of the oxidant relative to the cylinder jacket, and a duct system making it possible for a coolant to flow inside the burner, and, preferably on either side of the alignment of injectors, placed parallel to and all along the latter, solid metal sides (Continued)

rising from the injectors, and protective partitions situated on the top of the solid metal sides.

16 Claims, 1 Drawing Sheet

(51) Int. Cl.
| | | |
|---|---|---|
| *C03B 5/235* | (2006.01) | |
| *F23M 5/02* | (2006.01) | |
| *F23C 3/00* | (2006.01) | |
| *F23D 14/64* | (2006.01) | |
| *F23C 5/08* | (2006.01) | |
| *F23D 14/78* | (2006.01) | |

(52) U.S. Cl.
CPC .............. *F23C 5/08* (2013.01); *F23D 14/085* (2013.01); *F23D 14/64* (2013.01); *F23D 14/78* (2013.01); *F23D 91/02* (2015.07); *F23M 5/025* (2013.01); *C03B 2211/22* (2013.01); *C03B 2211/60* (2013.01); *F23D 2900/14641* (2013.01); *F23D 2900/14642* (2013.01)

(58) Field of Classification Search
CPC ........ F23D 14/085; F23D 14/64; F23D 91/02; F23D 2900/14641; F23D 2900/14642; F23C 5/08; F23C 3/004; F23M 5/025
See application file for complete search history.

(56) References Cited

U.S. PATENT DOCUMENTS

| | | | |
|---|---|---|---|
| 7,578,988 B2* | 8/2009 | Jacques | C01B 33/20 423/326 |
| 2005/0271992 A1 | 12/2005 | DeGrazia, Jr. et al. | |
| 2010/0089066 A1* | 4/2010 | Mina | F23D 1/06 60/772 |
| 2010/0139324 A1* | 6/2010 | Boulanov | C03B 37/048 65/469 |
| 2010/0242543 A1* | 9/2010 | Ritter | C03B 5/021 65/178 |
| 2012/0298922 A1* | 11/2012 | Mueller-Hagedorn | C01B 3/363 252/373 |

FOREIGN PATENT DOCUMENTS

| | | |
|---|---|---|
| EP | 0561376 A2 * | 9/1993 |
| GB | 1 157 010 | 7/1969 |
| WO | WO 2008/003909 | 1/2008 |

* cited by examiner

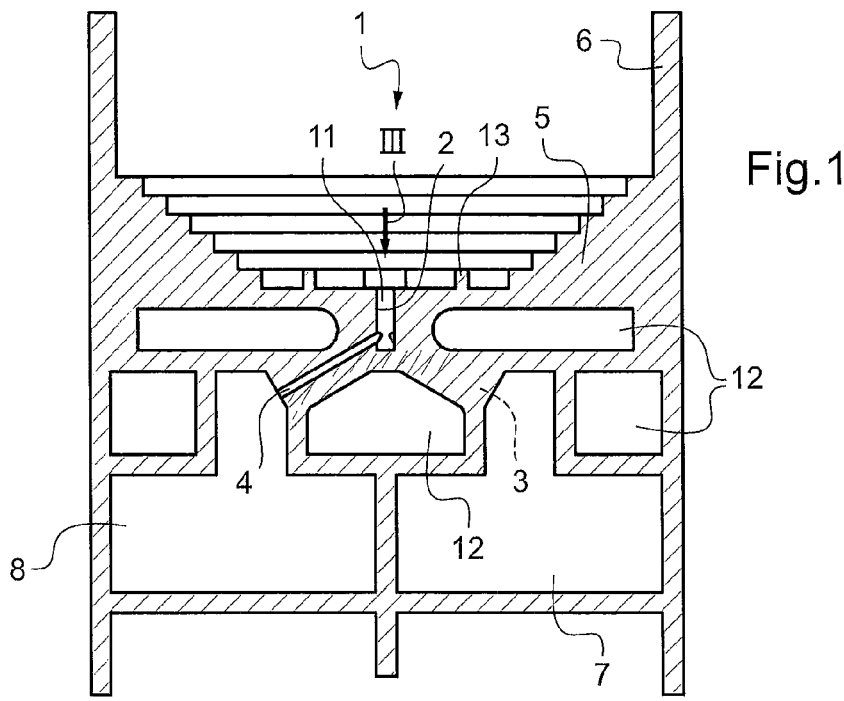
Fig.1
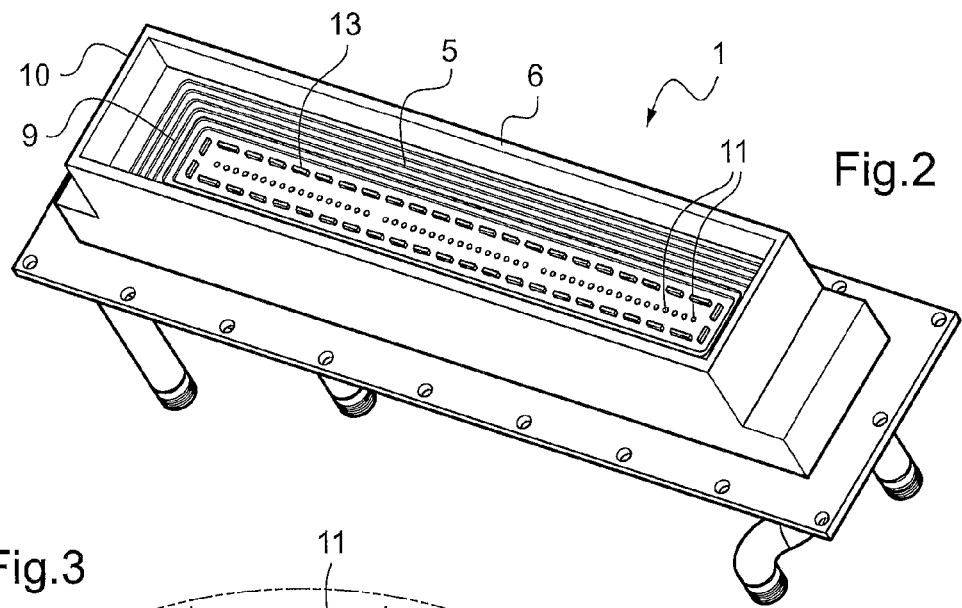
Fig.2
Fig.3
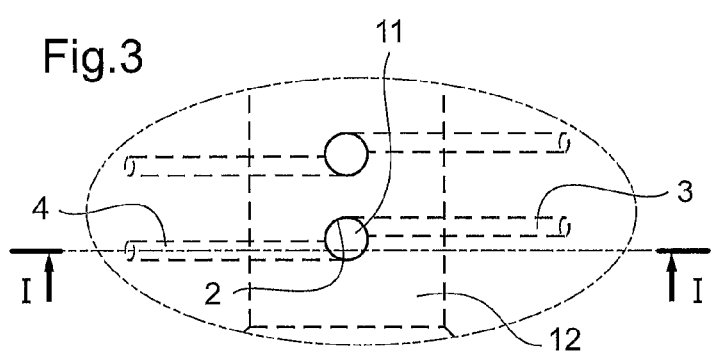

SUBMERGED BURNER WITH MULTIPLE INJECTORS

CROSS-REFERENCE TO RELATED APPLICATIONS

This application is the U.S, National Stage of PCT/FR2013/050237, filed Feb. 5, 2013, which in turn claims priority to French Application No, 1251170, filed Feb. 8, 2012. The contents of all of these applications are incorporated herein by reference in their entirety.

The present invention relates to a novel burner comprising an alignment of injectors, designed to be used as a submerged burner in a glass- or rock-melting furnace, in particular at temperatures that are sufficiently high to allow the melting of rock.

Rock is conventionally melted in furnaces of the cupola type heated with coke at temperatures at least equal to 1460° C.

The object of the present invention is to propose a novel type of burner making it possible to melt rock at high temperature (approximately 1500° C.) in a submerged-burner furnace hitherto used primarily for the melting of glass.

Since the melting of rock requires temperatures that are significantly higher than those used for the melting of glass, it is usually impossible to use the same installations for these two types of raw materials.

The two main problems that arise when it is desired to adapt a normal melting furnace, using submerged burners, to the melting of rock are,
- the excessive wear of the refractory ceramics conventionally used for the thermal insulation and the protection of the furnace walls and,
- the difficulty of using the thermal energy provided by the submerged burners in a sufficiently effective way to achieve the high temperatures required, without excessive waste of energy.

The wear of the refractory ceramics can be prevented by using a furnace with bare metal walls continuously cooled by a system of circulation of a coolant (a waterjacket). Then the particularly acute problem arises of obtaining a temperature of the molten materials that is particularly high, of the order of 1500° C., in a furnace with actively cooled walls.

The Applicant has discovered that it was however not impossible to simultaneously meet these two conflicting constraints by virtue of forming, at the interface between the cooled bare metal walls and the molten material, a layer of glass or rock crystals playing at the same time the role of a thermal insulator and the role of a layer protecting the metal walls against oxidation.

The research and testing carried out by the Applicant for the purpose of developing a furnace with submerged burners that is appropriate for melting rock at temperatures of approximately 1500° C. have however shown that, with normal submerged burners, it was unfortunately impossible to keep this solid insulating layer immediately next to the submerged burners and that the floor zone in the vicinity of the burners sustained unacceptable oxidation damage within only a few hours or days.

This oxidation damage was due to the need to inject sufficient energetic power by means of one or more submerged burners, to the absence of refractory ceramics, and to the existence of strong convection currents of the molten material close to the submerged flame, inherent in the use of submerged burners. A submerged flame that vacillates and is of high power thus causes the melting of the solidified layer close by and the oxidation of the underlying metal floor.

The novel submerged burner proposed in the present application has made it possible to considerably limit, and even in certain circumstances to eliminate, this oxidation damage of the metal floor of the furnace. By virtue of an original combination of various technical means, described in greater detail below, the Applicant has indeed succeeded in dividing and stabilizing the submerged flame of such a burner and in keeping immediately next to this submerged flame a protective layer formed by local solidification of the glass or of the rock being melted, while injecting a sufficient total quantity of energy and by optimizing the thermal transfer between the flame of the burner and the material being melted.

A submerged burner with a plurality of injectors aligned in two rows is already known from patent GB 1157010. It involves an air/gas burner which claims to make it possible to achieve temperatures of 1500° C. This burner however has no mixing chamber and the gaseous fuel is mixed with the oxidant (air) long before the injection into the molten material, which is considerably risky when the oxygen content of the oxidant is high.

The use of a submerged burner for the combustion of an air/gas mixture is furthermore unsatisfactory from an energy efficiency point of view. Specifically, the efficiency of energy transfer of an air/gas flame in a bath of molten glass at 1500° C. is only approximately 27% while it is equal to approximately 75% for an $O_2$/gas flame.

This advantage of better energy efficiency however comes with an increase in the problems of oxidation of the furnace walls and of the burner itself, these problems being all the greater if the oxygen content of the oxidant and the temperature of the flame are high. A methane/$O_2$ flame has a temperature of approximately 3000 K, considerably higher than the temperature of a methane/air flame which is only approximately 2200 K.

The main idea on which the present invention is based has therefore been to divide the extremely hot flame of a submerged burner operating with an oxidant that is considerably richer in oxygen than air, and to cool as efficiently as possible the burner zone immediately adjacent to the base of this plurality of small flames.

The burner of the present invention therefore comprises a multitude of individual injectors, each supplied individually by at least one fuel-supply duct and at least one oxidant-supply duct, the fuel and the oxidant being mixed in a mixing chamber, by virtue of the tangential flow of these two gaseous streams, before being ejected and burnt immediately after the outlet from the mixing chamber. It is important to understand that the multiplication and the miniaturization of the mixing chambers, made possible by virtue of a simple and clever geometry, has made it possible to use a submerged burner with a gas/oxygen mixture without risk of explosion and with great energy efficiency, while limiting the damage through oxidation of the metal surfaces immediately adjacent to the flames.

The subject of the present invention is therefore a submerged burner designed to be used in a furnace for melting glass or rock, comprising
- a plurality of in-line injectors, each injector comprising a cylinder-shaped mixing chamber, with an ejection orifice, a fuel-supply duct and an oxidant-supply duct opening into the mixing chamber at the cylinder jacket in a direction causing a tangential flow of the fuel and of the oxidant relative to the cylinder jacket, and a duct system making it possible for a coolant to flow inside the burner.

A further subject of the present invention is a furnace comprising at least one such burner as a submerged burner, and a method for melting vitrifiable materials using such a furnace.

As explained in the introduction, the alignment of a large number of injectors, each injector being a mixing chamber with a particular geometry, is at the heart of the present invention.

Those skilled in the art, by virtue of the detailed explanation that follows, are capable of determining the appropriate number of injectors per burner. The Applicant has obtained good results with burners comprising between 20 and 100, preferably between 30 and 80 injectors per burner.

Although in principle it is conceivable for the injectors to be aligned in several rows parallel with one another, it is preferred, for obvious reasons of simplicity of the geometry of the burner, that the latter comprises only one alignment of injectors. In other words, the injectors are preferably all aligned on a single straight line.

The cylindrical mixing chamber of each injector opens onto the surface of the burner through its ejection orifice, advantageously circular in shape. All the ejection orifices of an alignment of injectors preferably have substantially the same diameter, this diameter preferably being between 2 and 20 mm, in particular between 5 and 10 mm.

The distance separating two ejection orifices is advantageously identical or close to the diameter of these orifices, the distance/diameter ratio preferably being between 0.7 and 5, in particular between 0.9 and 3 and more preferably still between 1 and 2.

The height of the cylinder forming each of the mixing chambers is preferably between 12 and 30 mm, in particular between 14 and 25 mm and ideally between 15 and 23 mm. This cylinder height is a parameter that is important for the quality of the flame and the efficiency of the thermal transfer. Specifically, it determines the dwelling time of the gaseous mixture in the injector. When this dwelling time is too long, the gaseous mixture will flare too much inside the mixing chamber and this results in a thermal degradation of the mixing chamber. Conversely, heights that are too low (too short a dwelling time) do not allow the gaseous mixture to burn sufficiently and thus provide sufficient heat to keep a stable flame at the outlet of the injectors. This then risks the separation of the flames and incomplete combustion reactions.

The Applicant has found for example that mixing chambers with a diameter of 5 mm gave both well-connected flames and an efficient thermal transfer for a height of 15 mm.

The geometry of the fuel- and oxidant-supply ducts is also of great importance. The gaseous flow inside the mixing chamber must be even and allow an efficient mixing of the gases. For this, the fuel-supply duct and oxidant-supply duct advantageously open into the jacket of the cylinder close to the base of the latter, preferably in the bottom quarter of the jacket, and at diametrically opposed points.

The fuel- and oxidant-supply ducts advantageously narrow in the direction of flow of the gaseous streams that they carry. In other words, the section of the supply ducts is preferably minimal at the point at which they open into the mixing chamber.

The direction of injection of the gases (fuel/oxidant) in the mixing chamber is also of great importance. The Applicant has specifically found that it was indispensible to prevent an injection in the radial direction which led to great turbulence inside the mixing chamber and to instability of the flame. That is why the injection of the fuel and of the oxidant must be carried out in a tangential direction, the tangential flow of the gaseous mixture creating an even vortex.

In order to ensure the evenness of flow of the vortex, it is important for the speeds of injection of the two gases to be mixed to be almost identical. Those skilled in the art are easily capable of computing, depending on the desired stoichiometry of combustion and on the chemical composition of the fuel and of the oxidant, the appropriate ratio of the flow rates of each of the gases. For the injection speeds of the two gases to be approximately equivalent, the ratio of the cross sections of the two supply ducts —at the location where they open into the mixing chamber—must reflect the ratio of the gaseous flow rates. As an example, when the volumetric flow rate of the oxidant is twice the volumetric flow rate of the fuel, the cross section of the oxidant-supply duct must be twice the cross section of the fuel-supply duct.

As an example, for a $CH_4/O_2$ mixture (combustion stoichiometry 1:2), the ratio of the $O_2$-supply duct diameter to the $CH_4$-supply duct diameter is $2^{1/2}$.

The burner of the present invention therefore has the same number of mixing chambers as fuel-supply ducts and oxidant-supply ducts. All of the fuel-supply ducts preferably branch off from a common duct called in the present application the "fuel inlet". Similarly, all of the oxidant-supply ducts branch off from a common duct called the "oxidant inlet". Each of the two inlet ducts preferably contain a device for regulating the flow rate of the gases.

Moreover, each of the two common inlet ducts is dimensioned so as to deliver the fuel and oxidant with a constant pressure in the series of individual supply ducts. For this purpose, the common inlet ducts are designed with a cross section reduced in line with the distance of the injectors from the device for regulating the gas flow rate. This narrowing of the fuel and oxidant inlet ducts can be obtained by virtue of an inclination of the bottom partition of the ducts, for example in the manner described in GB 1157010. Moreover, the common inlet ducts may comprise partial partitions, or semi-partitions, which divide them into several subcompartments or sections communicating with one another.

The material forming the burner of the present invention is preferably refractory stainless steel, in particular 310 refractory stainless steel.

As explained in the introduction, in the melting furnaces of the present invention, the insulating refractory materials are advantageously replaced by an insulating layer of solidified glass formed on the surface of the bare metal walls. It will be easy to understand that it is well worthwhile to promote the formation of such an insulating and protective layer also on the surface of the burner. For this, the burner of the present invention advantageously comprises various technical means designed to stabilize such a crystalline layer.

The first of these means is the system of ducts used to circulate a coolant, preferably water, inside the burner. These ducts preferably extend just beneath the top surface of the burner, on either side of the alignment of injectors. They should also make it possible to cool the mixing chambers and the supply ducts, and the fuel and oxidant inlet ducts.

The formation of the solid layer is also promoted by the presence, on either side of the alignment of injectors, of solid metal sides placed parallel to and all along the latter. These metal sides rise from the injectors, that is to say their thickness increases with the distance relative to the injectors.

For a straight slope, the angle relative to the horizontal is preferably between 20 and 50°, in particular between 25 and 45°.

These ascending metal sides preferably comprise on their surface a plurality of protruding elements designed to promote the binding of the solidified glass elements and prevent them from sliding downwards, in the direction of the alignment of injectors. These protruding elements are preferably distributed fairly evenly over the whole surface of the sides. They may for example be peaks or partitions, the latter preferably being substantially perpendicular to the slope of the metal sides.

In preferred embodiment of the burner of the present invention, the metal sides have the shape of a staircase, or of tiers, with a plurality of steps. Specifically, the horizontal surfaces defined by the steps considerably reduce the risk of the layer of solidified glass slipping. The metal sides may comprise, like the body of the burner, a system of internal ducts making it possible to circulate a coolant, or else the system of cooling ducts may extend as far as the solid metal sides. However, this is not a preferred embodiment of the invention.

The metal sides situated on either side of the alignment of injectors have a dual role: on the one hand, they constitute a reserve of material that will oxidize before the body of the burner is attacked by corrosion. Moreover, the metal sides create around the alignment of injectors a protected zone where the only streams of molten material are the convection currents created by the plurality of flames. The flames sheltered from the streams of flow are thus stabilized and cause less damage to the metal surface of the burner and of the nearby sides.

There is an optimal distance between the alignment of injectors and the solid metal sides. This distance between the alignment of the injectors and the solid metal sides is preferably between 20 and 60 mm, in particular between 25 and 40 mm, and ideally close to 30 mm. When this distance is too small, that is to say less than 20 mm, the corrosion of the sides by the very hot flames is promoted. Conversely, too great a distance, significantly greater than 60 mm, will not make it possible to shelter the flames from the flow currents of the molten material and to create the conditions for a stabilization of the flames.

Advantageously, in the zone that separates the alignment of injectors from the metal sides, there are protruding elements such as teeth used like the protruding elements of the metal sides in order to promote the attachment of the solidified glass layer in contact with the metal surface of the burner.

Solid metal sides may also be present at the ends of the alignment of injectors, thus closing off the "valley" formed by the metal sides that run alongside the alignment of injectors. The burner of the present invention therefore advantageously comprises, at each of the ends of the alignment of injectors, a rising solid metal side forming a right angle with the solid metal sides placed parallel to the alignment of injectors. This advantageous embodiment is shown in FIG. 2.

The Applicant has found that the efficiency of the solid metal sides could be further enhanced by the presence of vertical protective partitions in contact with the metal sides and extending beyond the top of the latter, preferably over the whole length of the solid metal sides. These protective partitions preferably have a height, expressed relative to the top of the metal sides, of between 5 and 10 cm and a thickness of between 0.5 and 2.5 cm, preferably between 1 and 1.5 cm. These partitions are advantageously present not only on the metal sides parallel to the alignment of injectors, but also on those situated at the ends of the alignment of injectors.

The subject of the present invention is not only a burner with multiple flames as described above, but also a glass- or rock-melting furnace with
- a zone for the insertion of the vitrifiable materials,
- a zone for the outlet of the molten material and, between these zones,
- a zone for the flow of the molten material, the said furnace comprising, in the zone for the flow of the molten material, at least one submerged burner according to the invention, the said burner being placed so that the direction of alignment of the injectors is essentially perpendicular to the direction of flow of the molten material.

The burner is naturally used as a submerged burner, that is to say that it is installed on the floor of the furnace, preferably so that the ejection orifices are approximately at the same level as the surface of the furnace floor, the metal sides and partitions being in relief relative to the surface of the floor.

The burner may have a total length that is slightly less than but close to the width of the furnace. The furnace may then comprise a single submerged burner according to the invention covering almost the whole width of the furnace, or else several parallel submerged burners situated one after the other in the direction of flow of the molten material.

It would also be possible to envisage submerged burners that are sufficiently short to be aligned widthwise in the furnace, all of the burners covering essentially the whole width of the furnace.

Other configurations can be envisaged and those skilled in the art will be able to choose them so as to obtain the even melting of the vitrifiable materials.

As explained in the introduction, the furnace of the present invention is preferably used for melting rock at high temperatures, of the order of 1400 to 1600° C., higher than those necessary for melting glass. At these temperatures, the refractory ceramics used conventionally as thermal insulation materials in glass furnaces are subjected to excessive wear.

Although there is nothing in principle against the use of the burners of the present invention in normal furnaces comprising refracting insulating materials, these burners are particularly useful in furnaces operating at high temperature. In a preferred embodiment, the furnace of the present invention consequently comprises bare metal walls, for example made of A42CP boiler steel, directly in contact with the molten material and essentially has no insulating materials made of refractory ceramics, at least in the submerged zones of the furnace that are in contact with the glass or rock bath. The crown of the furnace of the present invention may optionally be insulated by means of refractory materials, although this is not a preferred embodiment.

The furnace, like the burner, preferably comprises at least one internal duct system making it possible for coolant to flow inside the walls of the furnace. These ducts advantageously cool all of the zones in contact with the bath of molten materials, having no refractory insulating materials.

Finally, the subject of the present invention is a method for melting vitrifiable materials using a furnace according to the present invention, the said method comprising,
- the insertion of vitrifiable materials into the furnace zone for the insertion of vitrifiable materials,
- the supply of the submerged burner or burners with a gaseous fuel, preferably natural gas, and with a gaseous oxidant, preferably oxygen, the drawing off of the molten material in the zone for the outlet of the molten materials, and the flow of a coolant, preferably water, in the duct systems provided for this purpose in the furnace walls and/or in the burner.

The vitrifiable materials advantageously comprise a certain fraction of rock, preferably of basaltic rock. This fraction is advantageously at least equal to 40%.

The presence of rock, in particular of basaltic rock, usually results in a considerable reduction in the viscosity of the molten material. Pure basaltic rock typically has a viscosity, at the liquidus temperature below 100 poises, while the viscosity of molten silica-based glasses is typically between 100 and 1000 poises. The method of the present invention using a burner with multiple miniaturized injectors as described above is particularly advantageous for molten materials having a low viscosity. Specifically, when conventional submerged burners are used in such low-viscosity molten materials, the steam bubbles formed that are of large size rise too rapidly to the surface of the glass bath and cause undesirable splashes on the crown of the furnace. Moreover, during this too rapid passage through the molten material, the transfer of heat between the hot steam bubble and the glass takes place only partially and the steam escapes into the laboratory before having reached the temperature of the molten glass. The use of a burner releasing a multitude of steam bubbles of smaller size slows down the ascent of the steam bubbles, increases the surface of contact between the bubbles and the glass and thus improves the efficiency of the thermal transfer. Consequently, in the melting method of the present invention, the to molten material preferably has a viscosity at the liquidus temperature of less than 200 poises, preferably less than 100 poises.

Since basaltic rock requires melting temperatures higher than those of silica-based glass, the temperature of the molten rock, immediately upstream of the zone for the outlet of the molten glass, is preferably between 1400° C. and 1600° C., in particular between 1450° C. and 1500° C.

By virtue of the large number of small-sized burners, the individual power of each burner can be limited. The Applicant has obtained good results in melting a basaltic rock (TA9 rock) at a temperature of 1500° C. with a plurality of injectors (50 injectors) each delivering 12 kW. Injectors delivering an individual power of 24 kW have also been tested. The method according to the invention consequently operates advantageously with injectors each delivering a power of between 10 and 80 kW, preferably between 12 and 50 kW and in particular between 12 and 30 kW.

The lower the power per injector, the shallower the depth of bath necessary for a total thermal transfer (temperature of the steam emerging from the glass bath=temperature of the glass bath).

The present invention is now illustrated with the aid of the appended figures in which, FIG. 1 shows a view in cross section of the burner of the present invention;

FIG. 2 shows a view in perspective of a burner according to the invention;

and FIG. 3 shows a view from the top of two injectors.

More particularly, FIG. 1 shows a cross section of a burner 1 according to the invention, the sectional plane passing through an injector comprising a cylindrical mixing chamber 2 opening through the ejection orifice 11 on the surface of the burner. Into the mixing chamber 2 there emerge an oxidant-supply duct 4, situated in the sectional plane, and a fuel-supply duct 3 outside the sectional plane. The fuel-supply duct 3 and the oxidant-supply duct 4 connect the mixing chamber respectively to a fuel-inlet duct 7 and an oxidant-inlet duct 8, which ducts are situated in the bottom portion of the burner 1. Ducts 12 used to circulate a coolant inside the burner run through the latter over almost the whole of its length. On either side of the injectors there are solid metal sides 5 in the form of a staircase or tiers. to In contact with the solid metal sides 5, vertical protective partitions 6 extend well beyond the highest point of the metal sides. Between the metal sides 5 and the injector, teeth 13 protrude from the body of the burner. These teeth are used mainly to stabilize the layer of solidified glass formed on the surface of the burner, directly next to the injectors and hence to the flame.

A certain number of these elements are found in FIG. 2, namely the protective partitions 6, the solid metal sides 5, the teeth 13 and, in the hollow of this structure, an alignment of several tens of injectors of which only the ejection orifices 11 are visible. This figure also shows, at each of the ends of the burner 1, solid metal sides 9 and protective partitions 10 in continuation respectively with the metal sides 5 and the partitions 6 and forming a right angle with the latter.

Finally, FIG. 3 shows more clearly the geometry of the mixing chamber 2 of an injector. The fuel-supply duct 3 and the oxidant-supply duct 4 open into the mixing chamber at diametrically opposed points. They inject the gas that they carry not in a radial direction but in a tangential direction so as to create a tangential flow of the gases and the formation of a vortex of gaseous mixture which leaves the chamber through the ejection orifice 11. The cooling duct 12 is shown by transparency beneath the mixing chambers 2.

The invention claimed is:

1. A melting furnace with a zone for the insertion of vitrifiable materials, a zone for the outlet of molten material and, between said zones, a zone for the flow of the molten material, said furnace comprising, in the zone for the flow of the molten material, at least one submerged burner comprising an alignment of a plurality of injectors, each injector comprising a cylinder-shaped mixing chamber, with an ejection orifice, a fuel-supply duct to supply a fuel and an oxidant-supply duct to supply an oxidant, said fuel-supply duct and said oxidant-supply duct opening into the mixing chamber at a cylinder jacket of the cylinder-shaped mixing chamber at diametrically opposed points and in a direction causing a tangential flow of the fuel and of the oxidant relative to the cylinder jacket, and a duct system for a coolant to flow inside the burner, said burner being placed so that a direction of alignment of the injectors is essentially perpendicular to a direction of flow of the molten material.

2. The melting furnace according to claim 1, comprising metal walls and wherein the furnace essentially has no insulating materials made of refractory ceramics, at least in the submerged zones.

3. The melting furnace according to claim 1, further comprising at least one duct system making it possible for a coolant to flow inside the furnace walls.

4. The melting furnace according to claim 1, wherein the fuel-supply duct and oxidant-supply duct open into a bottom quarter of the cylinder jacket.

5. The melting furnace according to claim 1, further comprising, on either side of the alignment of the plurality of injectors, placed parallel to and all along the latter, solid metal sides rising from the injectors, said solid metal sides having a thickness that increases with a distance relative to the plurality of injectors.

6. The melting furnace according to claim 5, wherein the solid metal sides comprise on their surface a plurality of protruding elements.

7. The melting furnace according to claim 6, wherein the plurality of protruding elements are distributed evenly over the whole surface of the sides.

8. The melting furnace according to claim 5, further comprising vertical protective partitions in contact with the solid metal sides and extending beyond a top of the solid metal sides.

9. The melting furnace according to claim 8, wherein a thickness of the vertical protective partitions is between 0.5 and 2.5 cm.

10. The melting furnace according to claim 8, wherein a height of the vertical protective partitions is between 5 and 10 cm.

11. The melting furnace according to claim 5, wherein the metal sides have a shape of a staircase with a plurality of steps.

12. The melting furnace according to claim 5, further comprising, at each of the ends of the alignment of injectors, a rising solid metal side forming a right angle with the solid metal sides placed parallel to the alignment of injectors, and optionally a vertical protective partition in contact with the solid metal side and extending beyond the top of the latter.

13. The melting furnace according to claim 5, wherein a distance between the alignment of the injectors and the solid metal sides is between 20 and 60 mm.

14. The melting furnace according to claim 1, wherein the fuel-supply ducts of the plurality of injectors branch off from a common fuel-inlet duct, and the oxidant-supply ducts of the plurality of injectors branch off from a common oxidant-inlet duct, each of the fuel-inlet and oxidant-supply ducts comprising a flow-regulating device.

15. The melting furnace according to claim 1, wherein the ejection orifice has a diameter of between 2 and 20 mm.

16. The melting furnace according to claim 1, wherein the cylinder-shaped mixing chamber has a height of between 12 and 30 mm.

* * * * *